US012650261B2

(12) United States Patent
Magaldi et al.

(10) Patent No.: US 12,650,261 B2
(45) Date of Patent: Jun. 9, 2026

(54) SYSTEM AND METHOD FOR THE THERMAL PROCESSING OF BULK MATERIAL BY INTENSE CONCENTRATED SOLAR POWER

(71) Applicant: MAGALDI POWER S.P.A., Rome (IT)

(72) Inventors: Mario Magaldi, Salerno (IT); Fulvio Bassetti, Rome (IT); Graham 'Gus' Nathan, Adelaide (AU); Alfonso Chinnici, Adelaide (AU); Bassam B. Dally, Adelaide (AU)

(73) Assignee: MAGALDI POWER S.P.A., Rome (IT)

( * ) Notice: Subject to any disclaimer, the term of this patent is extended or adjusted under 35 U.S.C. 154(b) by 765 days.

(21) Appl. No.: 17/995,139

(22) PCT Filed: Mar. 31, 2021

(86) PCT No.: PCT/IB2021/052680
§ 371 (c)(1),
(2) Date: Sep. 30, 2022

(87) PCT Pub. No.: WO2021/198942
PCT Pub. Date: Oct. 7, 2021

(65) Prior Publication Data

US 2023/0221070 A1 Jul. 13, 2023

(30) Foreign Application Priority Data

Apr. 3, 2020 (IT) ........................ 102020000007063

(51) Int. Cl.
*F26B 3/28* (2006.01)
*F26B 17/04* (2006.01)

(52) U.S. Cl.
CPC .............. *F26B 3/286* (2013.01); *F26B 17/04* (2013.01)

(58) Field of Classification Search
CPC .......... F26B 3/286; F26B 17/04; F26B 17/02; Y02B 40/18
(Continued)

(56) References Cited

U.S. PATENT DOCUMENTS 3,711,959 A 1/1973 Van Der Lely
4,706,651 A * 11/1987 Yudow .................... F24S 23/10 126/681
(Continued)

FOREIGN PATENT DOCUMENTS

CN 101907383 A 12/2010
CN 205403330 U 7/2016
(Continued)

OTHER PUBLICATIONS

International Search Report and Written Opinion for Corresponding International Application No. PCT/IB2021/052680, 10 Pages, May 7, 2021.

*Primary Examiner* — John P McCormack
(74) *Attorney, Agent, or Firm* — LUCAS & MERCANTI, LLP

(57) ABSTRACT

A treatment system for solid bulk materials such as limestone or mineral ore is provided having a belt conveyor configured for receiving the solid bulk material upon a transportation surface thereof and for displacing the material from a charging region to a discharging region according to a rectilinear path and a heating chamber, configured to receive a solar radiation conveyed by an external field of heliostats. A length portion of the transportation surface passes within or below the heating chamber so that thermal energy associated with the solar radiation is transferred to the bulk material by direct impingement or by reflection or
(Continued)

re-irradiation by internal surfaces or walls of the heating chamber.

21 Claims, 4 Drawing Sheets

(58) Field of Classification Search
USPC .......................................................... 34/426
See application file for complete search history.

(56) References Cited

U.S. PATENT DOCUMENTS

| | | | | |
|---|---|---|---|---|
| 2007/0294956 | A1 | 12/2007 | Sugawara et al. | |
| 2011/0315539 | A1* | 12/2011 | Zadik | C05F 7/00 202/215 |
| 2014/0298822 | A1* | 10/2014 | Ma | F03G 6/071 60/39.12 |
| 2017/0145324 | A1* | 5/2017 | Kodama | B01J 8/1836 |
| 2017/0152176 | A1* | 6/2017 | Behnisch | B28C 7/0007 |
| 2019/0238084 | A1* | 8/2019 | Fabbri | H10F 77/63 |
| 2021/0115345 | A1* | 4/2021 | Fu | C10J 3/84 |
| 2021/0336582 | A1* | 10/2021 | Lasich | F24S 60/10 |

FOREIGN PATENT DOCUMENTS

| | | | |
|---|---|---|---|
| CN | 109279756 | A | 1/2019 |
| CN | 109489344 | A | 3/2019 |
| EP | 0509286 | A1 | 10/1992 |
| JP | 2002285174 | A | 10/2002 |
| KR | 101627977 | B1 | 7/2016 |
| WO | 8704231 | A1 | 7/1987 |
| WO | 03071189 | A1 | 8/2003 |
| WO | 2004110674 | A2 | 12/2004 |
| WO | 2007034289 | A1 | 3/2007 |
| WO | 2015174236 | A1 | 11/2015 |
| WO | 2017021832 | A1 | 2/2017 |
| WO | 2018207106 | A2 | 11/2018 |

* cited by examiner

SYSTEM AND METHOD FOR THE THERMAL PROCESSING OF BULK MATERIAL BY INTENSE CONCENTRATED SOLAR POWER

CROSS-REFERENCE TO RELATED APPLICATIONS

This application is a 371 of PCT/IB2021/052680, filed Mar. 31, 2021, which claims the benefit of Italian Patent Application No. 102020000007063, filed Apr. 3, 2020.

FIELD OF THE INVENTION

The present invention relates to a system, plant and method for the thermal treatment or processing of solid bulk material, e.g. sand, limestone, mineral ore or metal, by a concentrated solar radiation.

BACKGROUND OF THE INVENTION

Many solid materials in bulk form require a massive thermal treatment, in order to acquire certain properties, e.g. for embrittlement/fragilization, to start chemical reactions, e.g. for calcination, or simply to heat up materials for further uses. The supply of thermal energy to such solid bulk material normally requires fuel combustion and produces polluting and greenhouse gas emissions, harmful to people and environment, including carbon monoxide and dioxide, nitrogen dioxide, ozone, particulate matter (PM), lead and sulfur dioxide.

Similar problems are encountered in the valuable exploitation of thermal energy of solar origin when it comes to effectively achieve a conversion into electric energy or other form of energy readily available to an end-user, including industry.

SUMMARY OF THE INVENTION

The technical problem posed and solved by the present invention is therefore to overcome the drawbacks mentioned above with reference to the state of the art, and in particular to attain an effective thermal treatment of solid bulk material.

The above problem is solved by a system according to claim 1 and by a method according to claim 14.

Preferred features of the invention are the object of the dependent claims.

The present invention solves the above technical problem by using concentrated solar power to provide thermal energy to solid bulk material received upon, and transported by, a mechanical conveyor resistant to high temperatures. The mechanical conveyor describes a path that passes through, or under, a heating—or high temperature—chamber into which, or at which, the solar radiation is concentrated.

The mechanical conveyor is realized, in a preferred configuration, by means of Magadi Superbelt technology®, based upon a steel double-wire mesh which carries partially overlapped steel pans bolted on, and supported by, upper idlers over its entire width. Compared to conventional chain conveyors, the mesh design ensures maximum dependability under the most severe condition (such as very high temperature and abrasive materials).

The mechanical conveyor can be made according to the disclosure of any of WO8704231A1, WO2004110674A1, WO2007034289A1 or WO03071189A1.

The heating chamber includes an aperture, preferably obtained on a lateral or top wall thereof, for the admission of concentrated solar radiation. The heating chamber can include multiple internal surfaces, also as defined by the chamber lateral walls and/or roof—or top-wall. In a preferred configuration, the bottom of the chamber can be open and connected to, or associated with, the mechanical conveyor, in order to allow passage of a running length portion of the latter with thermal communication between the inside of the chamber and the bulk material received upon the conveyor.

The chamber can be provided with a hood for hot air or other gas collection and delivery to a chimney or to gas treatment devices.

A running length of the mechanical conveyor is therefore located under, or within, the chamber, in such a way that the bulk material being conveyed receives thermal energy from the concentrated solar power. The solar radiation can impinge upon the bulk material directly, through reflections upon the chamber walls and/or by re-irradiation from said walls.

In the above configuration, the chamber is preferably internally lined with high temperature resistant tiles or refractory materials, which are exposed to the solar power directly entering through the aperture and, indirectly, reflected and/or re-irradiated by the chamber walls and roof wall.

Inside the chamber, behind the tiles or refractory, thermal insulation layers can be installed to limit heat dispersion to the environment.

The high temperature tiles or refractory surfaces exposed to solar power may have, in a preferred configuration, high reflection and emissivity, in order to maximize the solar power release to the material running below or within the chamber.

In order to concentrate the solar radiation into the heating chamber, an optical system can be provided. Such system can include a heliostat field to collect and concentrate solar radiation onto the heating chamber, eventually through interposition of one or more secondary reflectors.

In the above configuration, the bulk material temperature can be increased up to a desired value, for a desired time, suitable to make a thermal or thermo-chemical process happen or to perform a desired thermal treatment. In particular, under the effect of intense solar radiation power inside the heating chamber, the material transported upon the mechanical conveyor is heated up to high temperature values, e.g. up to a range of about 600-1000° C.

The invention finds application in many industrial processes, like limestone calcination, mineral ore comminution or fragilization and decarbonisation. For example, in case of limestone calcination, the conveyor is fed with limestone, solar power is concentrated by an optical system at the chamber and/or the conveyor, with the walls of the chamber eventually reflecting and/or re-irradiating thermal radiation or power to the belt conveyor. Under the effect of intense solar power concentration, limestone temperature increases up to the calcination temperature and is converted into lime, which stays on the belt, and $CO_2$, which is draft out of the chamber and eventually furtherly treated.

The use of solar energy in said processes reduces fuel and/or electricity consumption and $CO_2$ emissions.

The heat captured by the bulk material can also be used for other processes downstream the heating chamber, e.g. electric energy generation.

Process parameters like conveyor speed, material thickness on the transporting surface of the conveyor, conveyor length and width under thermal energy exposure in the chamber can be selected and adjusted, in order to meet specific conditions of a required thermal process.

According to specific embodiments, downstream the mechanical conveyor, a heat recovery system can be installed to draw (part of) the thermal energy contained in the hot material, for further uses. For example, a solid particle to steam heat exchanger can be arranged downstream the mechanical conveyor or along its path, in order to produce superheated steam that can be used for industrial purposes or, in turn, can drive a steam turbine for electricity generation.

In order to allow process continuity, in absence or in combination with sun radiation (night time or cloudy weather) a conveyor casing or cover can be equipped with ancillary heating elements, e.g. radiant burners or IR radiant panels, having the function to help heating up the bulk material.

Other advantages, features and use modes of the present invention will result evident from the following detailed description of some embodiments, provided by way of example and not with limitative purpose.

BRIEF DESCRIPTION OF THE DRAWINGS

Reference will be made to the figures of the annexed drawings, wherein.

DETAILED DESCRIPTION OF PREFERRED EMBODIMENTS OF THE INVENTION

Several embodiments and variants of the invention will be described below, with reference to the figures already introduced.

Generally speaking, analogous components are indicated in the various figures using corresponding reference numbers.

Further embodiments and variants other than those already described will be explained solely in conjunction with the relevant differences, if any, with respect to the preceding ones.

Moreover, the features of the various embodiments and variants described below are to be understood as combinable, where compatible.

Figure 1:
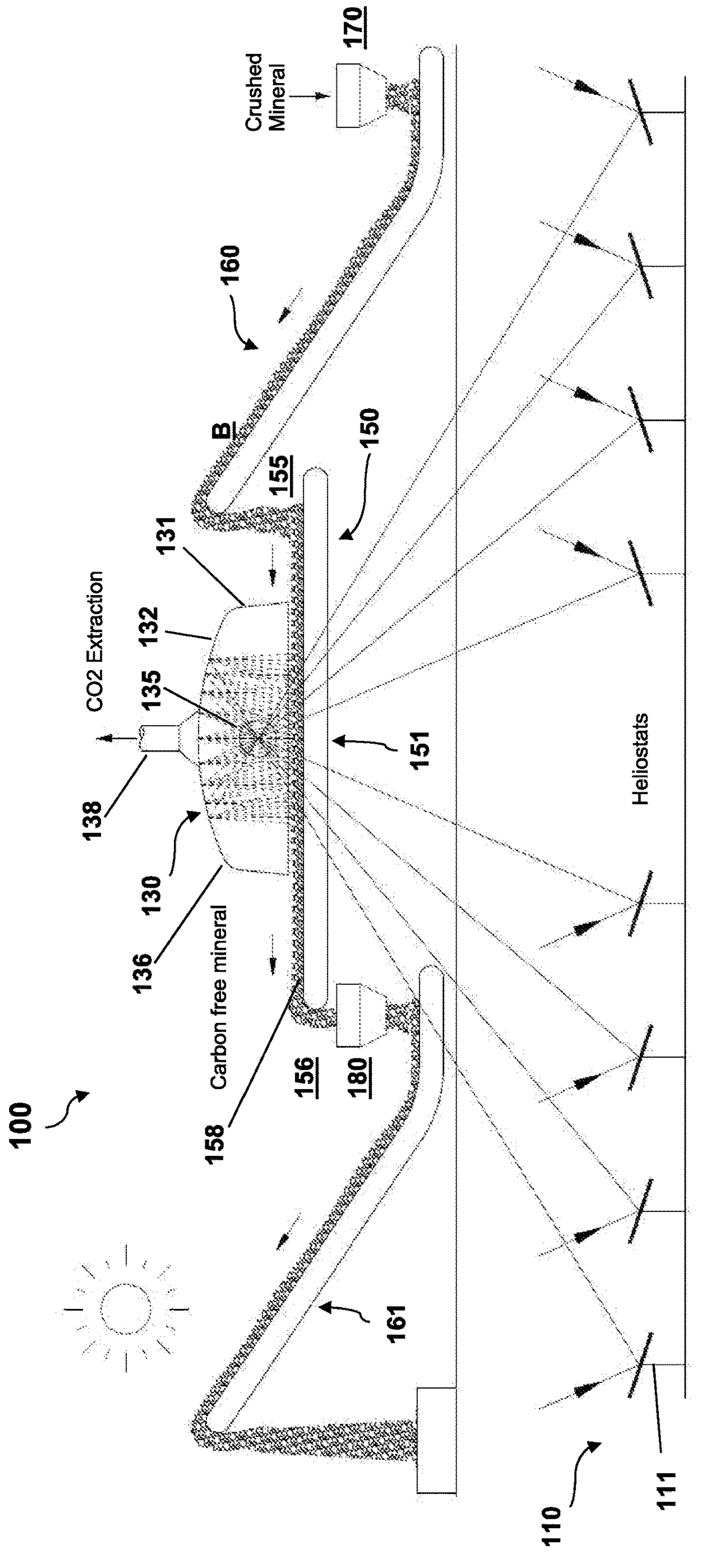
FIG. 1 shows a plant layout or system according to a preferred embodiment of the present invention, for application, e.g., in limestone calcination.

With reference initially to FIG. 1, a plant, or system, for the calcination of a solid bulk material, in particular limestone, is globally denoted by 100. The bulk material is represented in an exemplary way and denoted by B.

The calcination system of FIG. 1, and the process thereby implemented, allow lime production, with potential of $CO_2$ recovery.

Limestone calcination is a decomposition process, according to the following chemical reaction: $CaCO_3 = CaO + CO_2$.

The chemical decomposition reaction in air for pure $CaCO_3$ starts at about 850° C. Calcination of calcium carbonate is a highly endothermic reaction, which begins when the temperature is above the dissociation temperature of the carbonates in the limestone, the latter typically in the range of about 850-1340° C. Once the reaction starts, the temperature must be kept above the dissociation temperature, and $CO_2$ generated in the reaction must be removed.

According to the present embodiment, the system 100 comprises an optical arrangement 110 for concentrating the solar radiation upon a heating, or high temperature, chamber 130. A mechanical conveyor 150, in particular a belt conveyor, resistant to high temperatures is also provided, and configured to transport the solid bulk material. A length portion of the belt conveyor 150, denoted by 151, passes through, or under, heating chamber 130. The transportation direction of the mechanical conveyor 150 is indicated by arrows in FIG. 1.

The optical system 110 comprises a heliostat field, in particular a plurality of heliostats, one of which denoted by 111. The heliostats 111 are located at the ground and the solar radiation impinges directly upon them.

Preferably, the optical system 110 comprises a tracking system which allows the heliostats, or other optical elements, to follow the sun apparent movement across the sky.

The heating chamber 130 is located, in the present embodiment, in elevation above ground level, and it is configured to receive the concentrated solar power reflected by the heliostats. To this aim, an elevation supporting structure can be associated with heating chamber 130 and/or the mechanical conveyor 150.

In the present embodiment, the heating chamber 130 comprises several lateral walls, or a lateral skirt, 131, and a roof, or top, wall 132.

One or more lateral walls of the heating chamber 130 are equipped with an aperture, or opening, for the admission of the concentrated solar radiation inside the heating chamber 130. In the representation of FIG. 1, a single opening is visible and denoted by 135. In a preferred embodiment, the inlet opening 135 puts in direct communication the inside of the heating chamber 130 with the outer environment, being deprived, in use, of closing or shielding means.

The heating chamber 130 has internal surfaces of walls, denoted by way of example by 136 in FIG. 1, which comprise at least a reflecting and/or re-radiating surface configured to reflect the solar radiation entering the heating chamber 130 directly upon the length portion 151 of the mechanical conveyor 150 or upon another reflecting and/or re-radiating surface of said heating chamber 130.

According to a specific embodiment, the internal surfaces or walls of the heating chamber 130 comprise a plurality of reflecting surfaces, each one configured to reflect the solar radiation entering through the inlet opening 135, the overall configuration being such that the inletting radiation hits the bulk material downwards of multiple reflections upon said reflecting surfaces.

According to an embodiment, the internal surfaces or walls of the heating chamber 130 comprise a plurality of reflecting and/or re-radiating surfaces which are configured to re-radiate within the chamber thermal energy absorbed by the solar radiation, advantageously according to a radiant cavity configuration.

Advantageously, the reflecting and/or re-radiating surfaces have mutual view factors apt to reduce the radiant energy outletting the opening 135.

The aforementioned reflecting and/or re-radiating surfaces, or at least one of them, have a reflectivity belonging to one of the following schematizations: specular reflectivity, with radiation reflection angle equal to incidence angle; diffuse reflectivity, with reflection in all directions, independently from the radiation incidence plane; glossy reflectivity, with hybrid behaviour between specular and diffuse reflectivity.

In a preferred embodiment, the heating chamber 130 has a casing, e.g. as defined by wall 131 and 132, made (at least partially) of thermally insulating materials.

Preferably, as in the present example, the bottom of the heating chamber 130 is open and connected to, or associated with, the belt conveyor 150.

The heating chamber 130 can be provided with a hood and/or chimney 138 for $CO_2$ and hot air removal, which helps the calcination process to proceed.

The gas stream, containing $CO_2$, can be delivered to one or more gas treatment devices, preferably including a $CO_2$ capture arrangement and/or a waste heat recovery arrangement.

As mentioned above, the conveyor 150 is configured for receiving the solid bulk material upon a transportation surface 158 thereof, preferably having a substantially planar configuration, and for displacing said material from a charging region 155 to a discharging region 156. In the present embodiment, the conveyor 150 is based upon an endless belt, e.g. driven by mechanical components known in the art. In the present example, the conveyor belt follows, in its forward run or at least within or under the heating chamber 130, a substantially straight path.

As said above, the running length portion 151 of the belt conveyor 150 is located under, or within, the heating chamber, 130 and allows the bulk material receive thermal energy from the concentrated solar power. The solar radiation can impinge upon the bulk material directly, through reflections upon the chamber walls and/or by re-irradiation from said walls. In other words, the belt conveyor 150 is thermally connected to the heating chamber 130 at its length portion 151, in such a way that the solar radiation entering the chamber 130 through the aperture 135 transfers thermal energy to the bulk material being transported upon the belt conveyor 150.

As mentioned above, preferably the heating chamber 130 is internally lined with high temperature resistant tiles and/or refractory materials, which directly receive the solar power entering through the aperture 135 and/or which indirectly receive the solar power by reflection and/or re-irradiation by the other chamber walls 131, 132.

The heating chamber 130 is configured in such a way that the internal surfaces of its walls 131, 132 may feature proper view factors, suitable to maximize the emission of power towards the chamber bottom, where the limestone is being transported by the mechanical conveyor 150.

In a preferred embodiment, the bulk material has a higher absorbance value than that of the above-mentioned reflecting walls, so as to favour the quick transfer of the energy reflected and/or re-radiated by the walls towards the material itself.

In a preferred embodiment, the chamber surfaces have a high resistance to high temperatures, preferably over 1000° C., and/or a higher reflectivity than that of the bulk material, preferably higher than 70% if calculated with reference to the standard regulations ASTM G173 and ISO7668.

Process parameters like conveyor speed, material thickness on the conveyor, belt length of portion 151 under solar exposure and resident time under solar radiation can be selected and adjusted, in order to meet the specific needs and conditions of the calcination process.

Under the effect of intense solar radiation inside the chamber, the material temperature is increased up to the desired calcination value, for the desired time, suitable to obtain limestone decomposition.

Depending upon the optical system size and geometry, also the mechanical conveyor 150 can be located at a certain elevation above ground level, in which case an auxiliary conveying system 160 is used upstream the heating chamber 130 in order to lift the material and feed the belt conveyor 150 at the charging region 155. For this purpose, a conventional lifting conveyor, such as a belt conveyor, bucket elevators or similar devices and systems can be used.

An auxiliary conveyor 161 can be used at the discharging region 156.

In the exemplary representation of FIG. 1, an articulated path for the bulk material above the main belt conveyor 150 and side auxiliary conveying or lifting systems 160 and 161 are shown.

In the plant configuration of FIG. 1, a feeding device 170 of crushed material and a collecting device 180 of the heated material, located upstream and downstream the heating chamber 130, respectively, are also shown.

In a simplified embodiment, the mechanical conveyor may be a passive transportation surface, e.g. a chute.

Figure 2:
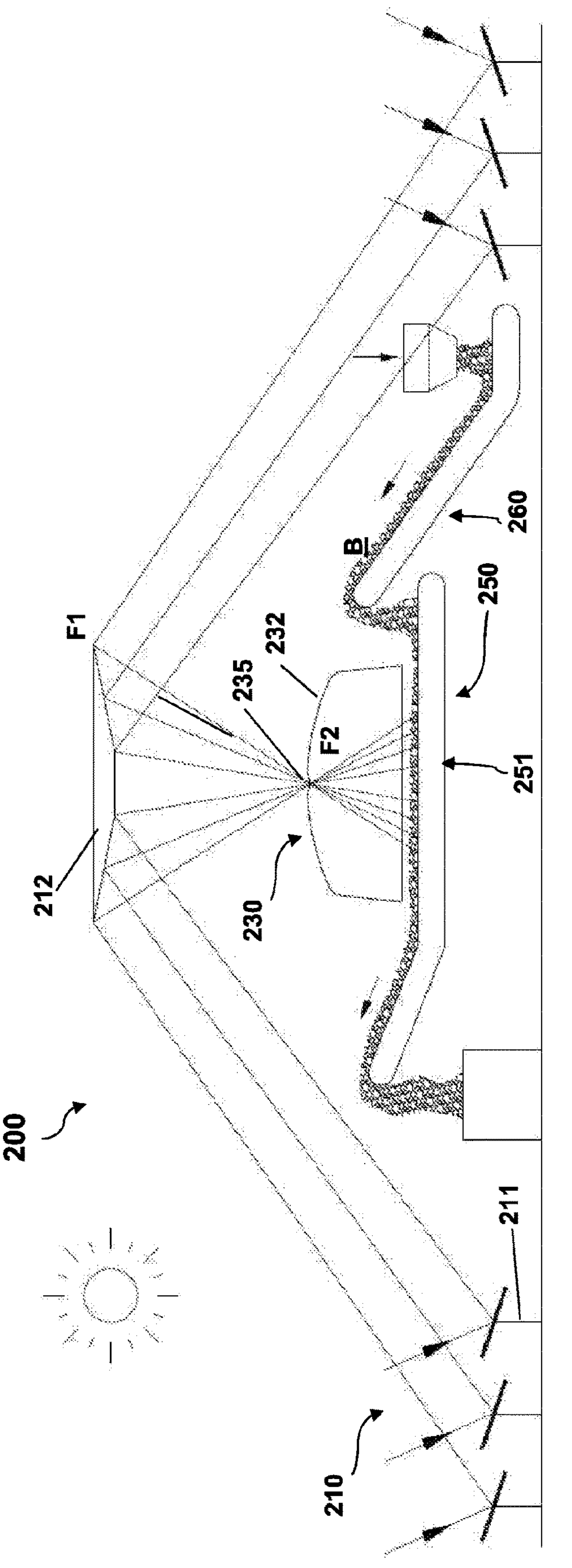
FIG. 2 shows a plant layout or system according to another preferred embodiment of the present invention, for application, e.g., in material embrittlement, comminution or fragilization.

FIG. 2 relates to a second embodiment of a plant or system according to the present invention, which is configured in particular for embrittlement or fragilization of mineral ores for improved comminution. The plant of FIG. 2 is globally denoted by 200.

Embrittlement of mineral ores allows reducing the electrical power necessary for a subsequent grinding, thus improving the overall process for ore comminution. Comminution is the process in which the ore is reduced to the desired size, allowing the maximum liberation of minerals, without change in the chemical and physical properties of the ore.

There are several methods of comminution, normally performed in two stages, crushing and pulverizing/grinding. However, mineral ore comminution requires the largest part of the energy consumed in mining operations, from 30 to 70%, which in global terms amounts to a huge quantity of power need for the mining sector worldwide.

For this reason, many sustainability initiatives have been designed in order to reduce the energy consumption in mining and the associated $CO_2$ emissions related to the use of fossil fuels for energy generation and, in general terms, to provide a solution for improving efficiency of energy consumption in comminution.

One of the possibilities to reduce the electrical power required for comminution is to embrittle the mineral ore by a proper thermal shock process phase. A conventional solution includes a heating phase of the mineral ore by fuel combustion—which however generates $CO_2$ emissions—followed by a quick quenching phase of the mineral in water, which embrittles the minerals—however also requiring water availability.

According to the invention, the plant of FIG. 2 employs concentrated solar power to provide thermal energy to the ore, transported as a solid bulk material upon a mechanical conveyor 250, in particular a belt conveyor, within or below a heating chamber 230.

The heating phase can be realized, using the system 200, in a very fast way and providing the required thermal shock which embrittles the mineral ore.

Also in this embodiment an optical system is provided, herein denoted by 210 and including a heliostat field arranged at the ground and comprising a plurality of heliostats 211, or primary reflectors, similar to the ones already described. The heliostats 211 concentrate the incident solar radiation upon one or more secondary optical elements, in particular one or more secondary reflectors, one of which is represented in FIG. 2 and therein denoted as 212. Therefore, the one or more secondary reflectors 212 are positioned at respective primary focal points, or focuses, F1 of the heliostats 211. The—or each—secondary reflector 212 is located at a proper elevation above ground level and it is configured to receive the concentrated solar power from the heliostats 211 and to reflect it at one or more (common) focal points, or focuses, F2 falling within the heating chamber and/or at a length portion 251 of belt conveyor 250 arranged below or within heating chamber 230. The heating chamber 230 has a top opening 235 arranged at a roof wall 232 thereof.

Therefore, the optical system 210 is configured as a beam-down concentration system, wherein the solar radiation is reflected in order to impinge from above the heating chamber 230 and/or the material upon the belt conveyor 250.

Also in this case, process parameters such as conveyor speed, material thickness on the conveyor, extension of belt length portion 251 and resident time under solar radiation can be selected and adjusted, in order to meet the specific conditions of the embrittlement process.

Thus, under the effect of intense solar radiation on the mechanical conveyor, the material temperature is increased up to the desired value, with the requested temperature raise ramp, suitable to make the mineral ore brittle.

Figure 3:
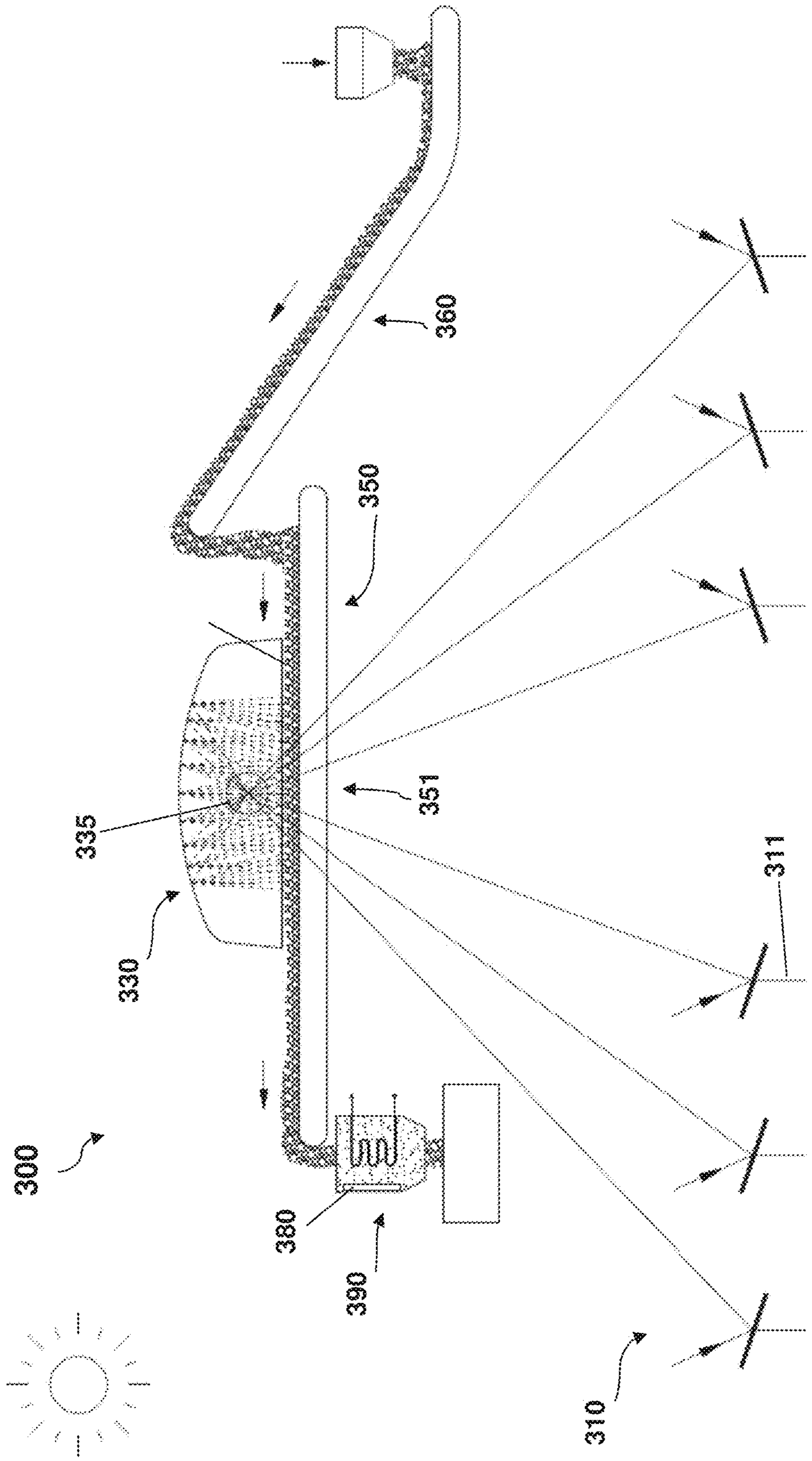
FIG. 3 shows a plant layout or system according to a further preferred embodiment of the present invention, for application, e.g., in electric power generation.

FIG. 3 relates to another embodiment of a plant or system according to the present invention, which is configured in particular for the collection of thermal energy from solar power and for subsequent or concomitant generation of thermal or electrical energy suitable for exploitation by an end user. The plant of FIG. 3 is globally denoted by 300.

Similarly to the configuration of FIG. 1, the plant or system 300 comprises an optical system 310 for concentrating the solar radiation upon a heating, or high temperature, chamber 330. A mechanical conveyor 350, in particular a belt conveyor, resistant to high temperatures is configured to transport a solid bulk material. A length portion 351 of the belt conveyor 350 passes through, or under, heating chamber 330.

The optical system 310 is provided, which comprises a heliostat field, i.e. a plurality of heliostats 311, located at the ground and upon which the solar radiation impinges directly.

The above components, and the associated parts or elements, can be the same as those of FIG. 1 and therefore will be not described further.

The heating chamber 330 can be provided with a hood for hot air removal—not represented in FIG. 3—so that air can be drawn and, in case, delivered to a waste heat recovery arrangement.

Downstream bulk material extraction from the heating chamber 330, a heat recovery system, in particular a heat exchanger 390, is provided, e.g. including tube bundle(s) or a serpentine crossed by an operative fluid which draws heat from the heated bulk material.

The operative fluid of heat exchanger 390 can be water, e.g. to produce superheated steam, $CO_2$ or supercritical $CO_2$, as well as air or other fluids, according to the need.

In the present embodiment, the heat exchanger 390 is arranged according to a vertical fall configuration for the bulk material.

The heat exchanger 390 can be realized, in preferred solutions, according to a counter-current configuration, to enhance the exergetic performances.

The cold bulk material, after heat exchange, can be cycled back to a lifting conveyor 360 upstream the heating chamber 330, e.g. in case of a closed loop system for continuous thermal or electrical power generation.

Heat extracted from the bulk material can be employed for different energetic or thermal uses, at industrial level or not. For example, it can be used for steam generation and converted in electric energy by means of a power block.

In case of electricity generation, superheated steam or supercritical $CO_2$ can be produced by the heat exchanger 390, to drive a steam turbine or a $CO_2$ turbine respectively.

The same arrangement of a heat recovery system, e.g. as based upon the heat exchanger 390, can be provided also in other plant configurations, e.g. those described above with reference to FIGS. 1 and 2. In particular, in case the bulk material has to undergo a specific thermal treatment process—such as the mineral ore embrittlement, as described above—the heat exchanger located downstream the conveyor accomplishes the twofold function to cool down the bulk material, so that it can be safely and reliably transported to its further use, and to recover its thermal energy content, that would otherwise be lost.

A hot tank (not represented in the figure) can be interposed downstream the mechanical conveyor 350 and the heat exchanger 390 in order to store the hot bulk material, discharged by the conveyor 350, for a certain time, according to the hot tank capacity. The hot tank is thermally insulated, in order to minimize heat losses to the environment during storing time. The interposition of said hot tank between mechanical conveyor 350 and heat exchanger 390 adds a thermal energy storage capability to the system 300: stored hot material can be discharged from the hot tank to the heat exchanger 390 at any time, independently from sun presence and solar radiation level, typically during night time. In this way the solar energy capture phase is decoupled from the generation phase of high temperature fluid (superheated steam, supercritical $CO_2$, hot air etc), so that the generation phase may happen independently from sun presence. Typically, the system 300, provided with the hot tank interposition, allows electricity production in absence of sun.

In another preferred configuration for electricity production, the heat exchanger 390 can be realized by means of thermophotovoltaic (TPV) panels 380 (FIG. 3), for a direct conversion process from heat to electricity. TPV panels can also be integrated in (a part of) the chamber 330 and in the portion of covers of the mechanical conveyor 350, downstream the chamber 330, in order to receive heat form the hot bulk material being conveyed and produce electricity.

Figure 4:
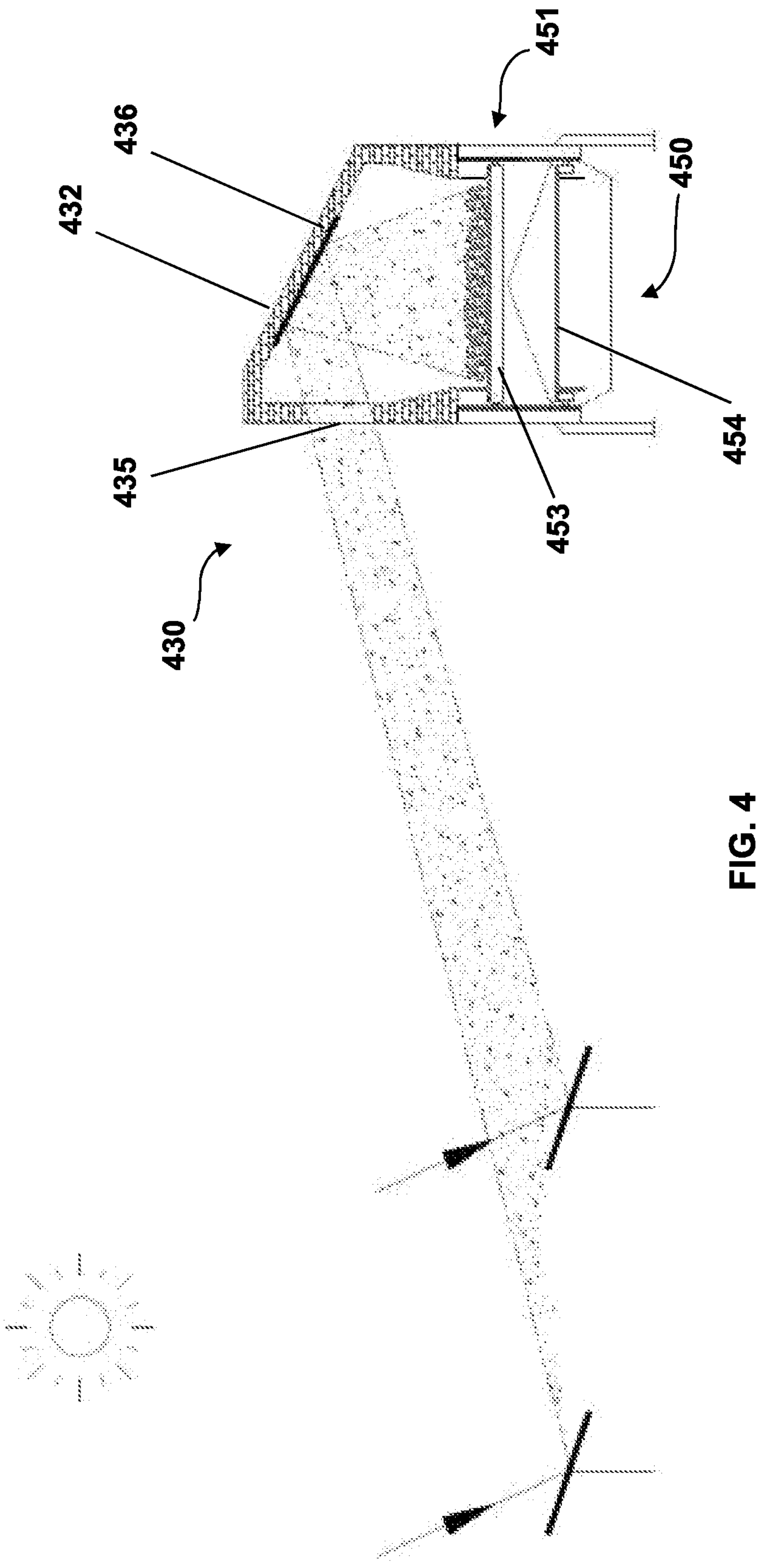
FIG. 4 shows a cross-sectional view of an embodiment of a heating chamber and a mechanical conveyor of any of the plant layouts or systems of the preceding figures.

FIG. 4 shows schematically an embodiment of a heating chamber, denoted by 430, that can be used in any of the system layouts described above.

The chamber has an inclined roof or lateral wall 432 defining an internal reflecting or re-irradiating surface 436. The solar radiation enters the chamber 430 through a lateral opening 435 and is reflected upon the bulk material by reflecting surface or element 436 arranged substantially at an opposite side with respect to opening 435.

At the bottom of the chamber 430, a belt conveyor 450 is arranged, having a forward run length 453 and a bottom run length 454.

According to a simplified heat balance, in a possible embodiment discussed only by way of example, in a small size plant the following typical sizing parameter are obtainable.

By assuming a solar power of 8 MWt entering the chamber aperture from the heliostats field, conveyor width of 2 m, conveyor speed of 5 cm/s, average material thickness on the conveyor of 4 cm, material heating length below the chamber of 8 m, material specific weight of 1.4 $t/m^3$, chamber thermal efficiency at 90%, the system can be able to heat up to 1000° C., from ambient temperature, approximately 20 t/h of material in 160 s.

The present invention has been described so far with reference to preferred embodiments. It is intended that there may be other embodiments which refer to the same inventive concept as defined by the scope of the following claims.

The invention claimed is:

1. A treatment system for solid bulk material, which treatment system comprises:

a mechanical conveyor, configured for receiving the solid bulk material upon a transportation surface thereof and for displacing said material from a charging region to a discharging region;

a heating chamber having internal surfaces or walls, configured to receive a solar radiation conveyed by an external optical arrangement, wherein a length portion of said transportation surface passes within or below said heating chamber so that thermal energy associated with said solar radiation is transferred to the solid bulk material by direct impingement or by reflection or re-irradiation by internal surfaces or walls of said heating chamber, wherein said internal surfaces or walls of said heating chamber comprise a reflecting and/or re-radiating surface configured to reflect the solar radiation entering said heating chamber directly upon said length portion of said mechanical conveyor, thereby directly onto the solid bulk material, or upon another reflecting and/or re-radiating surface of said heating chamber, thereby causing the solar radiation to impinge directly onto the solid bulk material.

2. The treatment system according to claim 1, wherein said mechanical conveyor is a belt conveyor.

3. The treatment system according to claim 1, wherein said heating chamber comprises an inlet opening for the solar radiation.

4. The treatment system according to claim 3, wherein said inlet opening puts in direct communication the inside of the heating chamber with the outer environment, being deprived, in use, of closing or shielding means.

5. The treatment system according to claim 3, wherein said inlet opening is arranged at a lateral or roof wall of the heating chamber.

6. The treatment system according to claim 1, wherein said heating chamber comprises an outflow device for the outflow of gases from the heating chamber.

7. The treatment system according to claim 1, further comprising a lifting device, positioned upstream of said heating chamber with respect to a transportation direction of said mechanical conveyor.

8. The treatment system according to claim 1, further comprising a material crushing arrangement positioned upstream of said heating chamber with respect to a transportation direction of said mechanical conveyor.

9. The treatment system according to claim 1, further comprising a heat recovery arrangement, positioned downstream of said heating chamber with respect to a transportation direction of said mechanical conveyor.

10. The treatment system according to claim 9 wherein said heat recovery arrangement includes thermophotovoltaic panels.

11. The treatment system according to claim 1, wherein said heating chamber and said length portion of said mechanical conveyor are arranged in elevation with respect to the ground.

12. The treatment system according to claim 1, which comprises said optical arrangement.

13. The treatment system according to claim 12, wherein said optical arrangement comprises a plurality of reflection elements positioned at a ground level.

14. The treatment system according to claim 12, wherein said optical arrangement has a beam-down configuration, comprising one or more primary reflectors arranged at a ground level and one or more secondary reflectors arranged in elevation, to convey the solar radiation from above to the heating chamber.

15. The treatment system according to claim 1, comprising a hot tank for storage of the heated material, which is arranged downstream of said heating chamber.

16. A method of thermal treatment method for solid bulk material using the treatment system of claim 1, comprising:

transporting the solid bulk material upon the transportation surface according to the mechanical conveyor; and making length portion of said transportation path pass through, or under, the heating chamber, configured to receive a solar radiation conveyed by an external optical arrangement, so that thermal energy associated with said solar radiation is transferred to the solid bulk material by reflection or re-irradiation by internal surfaces or walls of said heating arrangement.

17. The method according to claim 16, wherein the method is performed in a bulk material calcination system.

18. The method according to claim 17, wherein the method is performed in a limestone calcination system or a mineral ore calcination system.

19. The method according to claim 16, wherein the method is performed in a bulk material embrittlement system.

20. The method according to claim 16, wherein the method is performed in a thermal or electric energy generation system.

21. The treatment system according to claim 1, wherein said transportation surface is at least partially a substantially planar surface.

* * * * *